(12) United States Patent
Rothenbuhler

(10) Patent No.: US 10,259,632 B2
(45) Date of Patent: Apr. 16, 2019

(54) RECLOSABLE PACKAGING

(71) Applicant: Amcor Flexibles Burgdorf GmbH, Burgdorf (CH)

(72) Inventor: Martin Rothenbuhler, Langnau i.E. (CH)

(73) Assignee: Amcor Flexibles Burgdorf GmbH, Burgdorf (CH)

( * ) Notice: Subject to any disclaimer, the term of this patent is extended or adjusted under 35 U.S.C. 154(b) by 0 days.

(21) Appl. No.: 15/551,750

(22) PCT Filed: Feb. 15, 2016

(86) PCT No.: PCT/EP2016/053103
§ 371 (c)(1),
(2) Date: Aug. 17, 2017

(87) PCT Pub. No.: WO2016/131742
PCT Pub. Date: Aug. 25, 2016

(65) Prior Publication Data
US 2018/0029772 A1 Feb. 1, 2018

(30) Foreign Application Priority Data
Feb. 20, 2015 (EP) .................................... 15155976

(51) Int. Cl.
*B65D 77/20* (2006.01)
*B65D 75/58* (2006.01)
(Continued)

(52) U.S. Cl.
CPC ............ *B65D 75/5855* (2013.01); *B32B 3/02* (2013.01); *B32B 3/26* (2013.01); *B32B 5/18* (2013.01);
(Continued)

(58) Field of Classification Search
CPC ............ B65D 75/5855; B65D 75/5833; B65D 65/40; B65D 77/20; C09J 133/10;
(Continued)

(56) References Cited

U.S. PATENT DOCUMENTS

| 2,884,126 A | 4/1959 | Ulrich |
| 2005/0276525 A1 | 12/2005 | Hebert et al. |
| 2008/0274420 A1 | 11/2008 | Song et al. |

FOREIGN PATENT DOCUMENTS

| EP | 0 191 003 A1 | 8/1986 |
| EP | 0 193 130 A2 | 9/1986 |

(Continued)

OTHER PUBLICATIONS

Czech, Z.; Crosslinking of pressure sensitive adhesive based on water-borne acrylate, Polymer International; vol. 52, No. 3, Feb. 17, 2003; pp. 347-357.

*Primary Examiner* — Michael C Miggins
(74) *Attorney, Agent, or Firm* — Reinhart Boerner Van Deuren P.C.

(57) ABSTRACT

The present invention is related to a flexible laminate for forming a reclosable packaging container comprising a built-in opening and reclose feature, said laminate comprising an inner structure and an outer structure, adhesively joined face-to-face, the outer structure forming the outer surface of the container and the inner structure forming the inner surface of the container, the outer structure comprising an outer flap portion delimited by a scoring line through the outer structure, and an inner structure comprising an inner flap portion delimited by a scoring line through the inner structure, the inner score line and the outer score line creating an opening into the container when the flap portions are peeled back, a marginal region of the outer flap portion extending beyond an edge of the inner flap portion and overlying an underlying surface of the inner structure, the (Continued)

inner and outer flap portions being joined in a second adhesive region and the first adhesive region being disposed between the marginal region of the outer flap portion and the underlying surface of the inner structure for attaching and re-attaching, in use, the outer flap portion to the underlying surface, wherein the bond/peel strength, measured according to ASTM F904-1998 (reapproved 2008), of the first adhesive is smaller than the bond/peel strength of the second adhesive, the first adhesive being permanently tacky and covering the entire surface of either the inner structure or the outer structure, said first adhesive being patterned covered by one or more crosslinker(s), transforming a part of the layer thickness of said first adhesive into the second adhesive and creating patterns of the first adhesive region and second adhesive region, said second adhesive of the second adhesive region having a higher degree of crosslinking than said first adhesive of the first adhesive region.

22 Claims, 4 Drawing Sheets

(51) Int. Cl.

| | |
|---|---|
| B65D 65/40 | (2006.01) |
| C09J 133/10 | (2006.01) |
| C09J 175/04 | (2006.01) |
| B32B 7/12 | (2006.01) |
| B32B 27/08 | (2006.01) |
| B32B 27/32 | (2006.01) |
| B32B 27/36 | (2006.01) |
| B32B 37/12 | (2006.01) |
| B32B 38/04 | (2006.01) |
| C09J 5/02 | (2006.01) |
| C08G 18/62 | (2006.01) |
| C08G 18/79 | (2006.01) |
| C09J 133/00 | (2006.01) |
| B32B 5/18 | (2006.01) |
| B32B 15/082 | (2006.01) |
| B32B 15/085 | (2006.01) |
| B32B 15/088 | (2006.01) |
| B32B 15/09 | (2006.01) |
| B32B 15/20 | (2006.01) |
| B32B 27/06 | (2006.01) |
| B32B 27/10 | (2006.01) |
| B32B 27/16 | (2006.01) |
| B32B 27/30 | (2006.01) |
| B32B 27/34 | (2006.01) |
| B32B 3/02 | (2006.01) |
| B32B 3/26 | (2006.01) |

(52) U.S. Cl.
CPC .............. *B32B 7/12* (2013.01); *B32B 15/082* (2013.01); *B32B 15/085* (2013.01); *B32B 15/088* (2013.01); *B32B 15/09* (2013.01); *B32B 15/20* (2013.01); *B32B 27/065* (2013.01); *B32B 27/08* (2013.01); *B32B 27/10* (2013.01); *B32B 27/16* (2013.01); *B32B 27/306* (2013.01); *B32B 27/32* (2013.01); *B32B 27/34* (2013.01); *B32B 27/36* (2013.01); *B32B 37/12* (2013.01); *B32B 38/04* (2013.01); *B65D 65/40* (2013.01); *B65D 75/5833* (2013.01); *B65D 77/20* (2013.01); *C08G 18/6225* (2013.01); *C08G 18/797* (2013.01); *C09J 5/02* (2013.01); *C09J 133/00* (2013.01); *C09J 133/10* (2013.01); *C09J 175/04* (2013.01); *B32B 2250/02* (2013.01); *B32B 2250/03* (2013.01); *B32B 2255/10* (2013.01); *B32B 2255/102* (2013.01); *B32B 2255/20* (2013.01); *B32B 2255/205* (2013.01); *B32B 2307/31* (2013.01); *B32B 2307/40* (2013.01); *B32B 2307/514* (2013.01); *B32B 2307/70* (2013.01); *B32B 2307/7244* (2013.01); *B32B 2307/7246* (2013.01); *B32B 2307/748* (2013.01); *B32B 2307/75* (2013.01); *B32B 2323/10* (2013.01); *B32B 2553/00* (2013.01); *B65D 2575/586* (2013.01); *C09J 2433/00* (2013.01); *C09J 2475/00* (2013.01)

(58) Field of Classification Search
CPC . C09J 175/04; C09J 5/02; C09J 133/00; C09J 2433/00; C09J 2475/00; C08G 18/6225; C08G 18/797; B32B 7/12; B32B 27/08; B32B 27/32; B32B 27/36; B32B 37/12; B32B 38/04; B32B 5/18; B32B 15/082; B32B 15/085; B32B 15/088; B32B 15/09; B32B 15/20; B32B 27/065; B32B 27/10; B32B 27/16; B32B 27/306; B32B 27/34; B32B 3/02; B32B 3/26; B32B 2323/10; B32B 2553/00; B32B 2250/02; B32B 2250/03; B32B 2255/10; B32B 2255/102; B32B 2255/20; B32B 2255/205; B32B 2307/31; B32B 2307/40; B32B 2307/514; B32B 2307/70; B32B 2307/7244; B32B 2307/7246; B32B 2307/748; B32B 2307/75

See application file for complete search history.

(56) References Cited

FOREIGN PATENT DOCUMENTS

| | | |
|---|---|---|
| EP | 0 904 853 A2 | 3/1999 |
| EP | 0 957 045 A1 | 11/1999 |
| EP | 1 375 617 A1 | 1/2004 |
| EP | 1 449 789 A1 | 8/2004 |
| EP | 2 243 716 A1 | 10/2010 |
| EP | 2 257 479 A1 | 12/2010 |
| EP | 2 323 921 A1 | 5/2011 |
| EP | 2 347 972 A1 | 7/2011 |
| WO | WO 98/22367 | 5/1998 |
| WO | WO 00/34008 | 6/2000 |
| WO | WO 2004/009720 A3 | 1/2004 |
| WO | WO 2005/123535 A1 | 12/2005 |
| WO | WO 2008/062159 A1 | 5/2008 |
| WO | WO 2008/115693 A1 | 9/2008 |
| WO | WO 2009/111153 A1 | 9/2009 |
| WO | WO 2010/002834 A1 | 1/2010 |
| WO | WO 2010/080810 A1 | 7/2010 |
| WO | WO 2011/032064 A1 | 3/2011 |
| WO | WO 2011/069575 A1 | 6/2011 |
| WO | WO 2011/110272 A1 | 9/2011 |
| WO | WO 2013/048934 A1 | 4/2013 |
| WO | WO 2014/186169 A1 | 11/2014 |
| WO | WO 2016/131740 A1 | 8/2016 |
| WO | WO 2016/131741 A1 | 8/2016 |

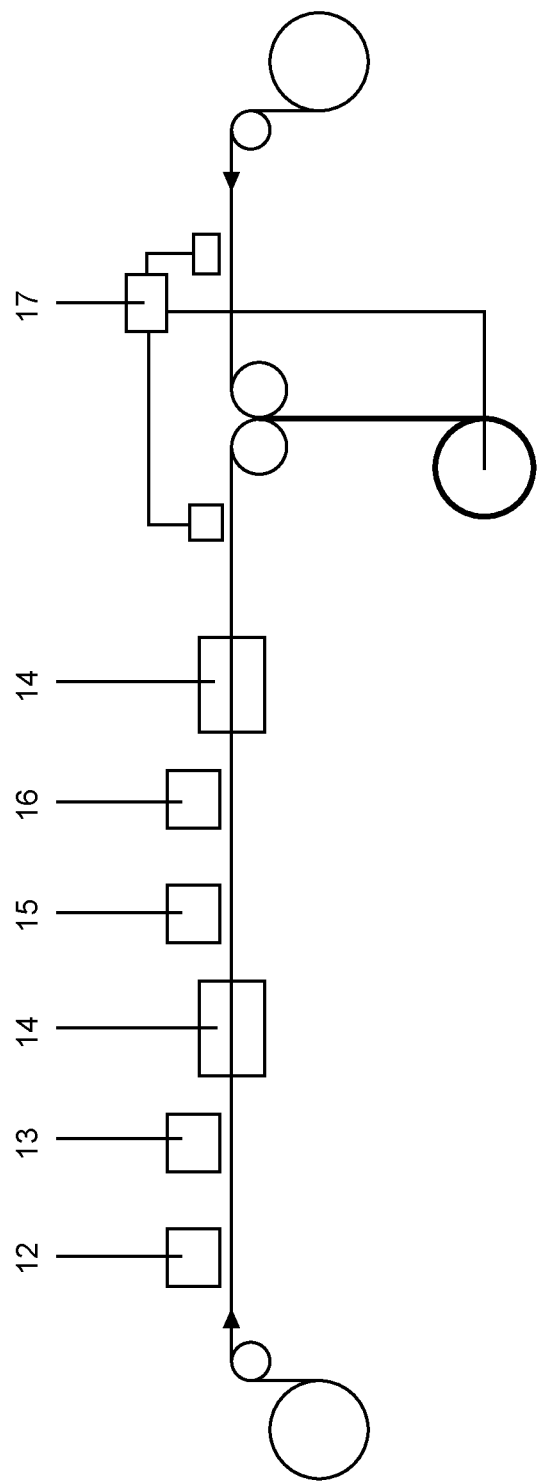

RECLOSABLE PACKAGING

FIELD OF THE INVENTION

The present invention is related to reclosable packaging containers comprising a flexible laminate with a built-in opening and reclose arrangement, and to a method for the production of this flexible laminate.

STATE OF THE ART

Flexible packaging materials are used in many applications and obtained by various form fill and seal technologies using laminates of specific constitutions, generally tailormade for their specific applications.

Flexible laminates are well known in the flexible packaging industry. The laminates are usually obtained by adhesive laminations of one or more polymer films comprising lacquers, barrier layer and metallisation layer, etc. with other possible layers such as paper, metal foils, and the like. The polymer layer may be extruded, coextruded and/or joined by permanent adhesive (PA) and/or pressure-sensitive adhesive (PSA), to the final laminate.

Flexible packages often contain products that may be used progressively over a longer period of time. If the package is not reclosable, the products are susceptible to premature aging because they are exposed to the moisture of the surrounding environment. It is therefore important to be able to correctly reclose a package after its initial opening to keep the product that remains in the package fresh.

Various built-in opening and reclose arrangements have been developed for flexible packaging containers in the last decades.

The built-in opening and reclose systems of the prior art are obtained by specific score lines performed on both sides of the flexible laminate and delimiting adhesive pattern configurations. Each of those configurations has its specific advantages and drawbacks.

Nakamura discloses in EP 0 193 130 (1986) one of the first built-in opening and reclose structures in a laminate.

Alusuisse discloses in EP-A1-0 957 045 (1999) a packaging with a built-in opening and reclose flap obtained by a laminate comprising pattern-applied, permanent and pressure-sensitive adhesives in register. The laminate comprises an outer structure and an inner structure. The outer structure comprises a barrier layer. The pressure-sensitive adhesive can be positioned on the inner or outer structure. The permanent adhesives and the pressure-sensitive adhesives are both applied on the same inner or outer structure and the score lines are performed separately on the inner structure and on the outer structure of the laminate.

Alcan discloses in EP-A1-1449 789 (2004) a packaging with a built-in opening and reclose flap obtained by a laminate comprising an outer structure and an inner structure. In a first embodiment, the laminate comprises pattern-applied, permanent and pressure-sensitive adhesives in register, and in a second embodiment a permanent adhesive is applied on the entire surface on the first structure of the laminate and a pattern-applied pressure-sensitive adhesive on the second structure of laminate. In this case, the permanent adhesive and the pressure-sensitive adhesives are superimposed where the PSA is pattern applied and creates a local detrimental increase of thickness entailing a deformation of the produced reel of the laminate. The disclosed outer and inner structures may comprise a series of layers, among them a barrier layer. The pressure-sensitive adhesive can be positioned on the inner or on the outer structure. The permanent adhesive and the pressure-sensitive adhesive are both applied separately on the first and second structures of the laminate. The score lines are performed separately on the inner and outer structures before the structures are joined face to face and form the laminate.

Sonoco discloses in WO 2005/123535 A1 (2005) a packaging with a built-in opening and reclose flap obtained by a laminate comprising pattern-applied permanent and pressure-sensitive adhesives in register. The permanent adhesive does not cover the pressure-sensitive adhesive. The laminate comprises an outer structure and an inner structure, the inner structure comprises a seal layer and a barrier layer, in particular a metallized polymer layer that is able to reflect a laser beam possibly used to perform the score lines. The pressure-sensitive adhesive remains positioned on the flap after a first opening. The permanent adhesive and the pressure-sensitive adhesives are both applied in register on the same first or second structure of the laminate and the score lines are performed on the finished laminate after joining of the inner and outer structures of the laminate.

Sonoco, in a divisional application EP-A1-2 243 716 of WO 2005/123535 A1, claims the replacement of the permanent adhesive by a pressure-sensitive adhesive, wherein the first and second structures of the laminate are joined by a pressure-sensitive adhesive layer without the use of any permanent adhesive.

Wrigley in WO 2008/115693 A1 (2008) discloses a method for making a flexible built-in opening and reclose feature in a laminate comprising pattern-applied permanent adhesive and a strip of pressure-sensitive adhesive in register in the marginal region between the score lines. The laminate comprises a first structure and a second structure. The first structure is independently scored before joining the second structure and forming a laminate. The second score line is then performed on the laminate.

Printpack Illinois discloses in WO 2010/080810 A1 a reclosable container with built-in opening and reclose feature based on the inner and outer sides of a laminate with a resealable cover portion and a pressure-sensitive adhesive affixing the inner side to the outer side. Here, the basic difference compared to the mentioned prior art before 2010 is that the permanent adhesive is replaced by a heat seal.

Avery Dennison in WO 2011/032064 (2011) discloses a resealable packaging laminate with a built-in opening and reclose arrangement comprising an outer and an inner laminate portion. The outer and inner score lines being arranged to define a marginal region comprising a pressure-sensitive adhesive at least partly in contact with a release layer positioned on the inner layer.

Hochland in EP 2 347 972 A1 (2011) discloses a reclosable packaging, in particular a lid for a tray, with a built-in opening and reclose arrangement comprising a rupturable weakening line in the lid. The lid is obtained by a laminate comprising permanent adhesive in the central area of the lid and pressure-sensitive adhesive in the border area of the lid. The outer structure comprises among other possible layers a barrier layer.

Other laminates, specifically related to cigarette-pack inner or outer wrapper comprising similar built-in opening and reclose arrangements are disclosed by BAT in WO 98/22367 and WO 2008/062159 or by Focke in WO 2011/069575 and WO 2011/110272.

Sonoco in EP 2 257 479 B1 discloses a flexible packaging laminate having built-in opening/reclose and tamper-evidence features by forming the laminate from an outer structure joined in face-to-face relation to an inner structure. Score lines are formed in both structures to enable an opening to be formed through the laminate by lifting a flap out of the plane of the laminate. The score line through the outer structure defines a larger opening than the score line through the inner structure, such that a marginal region of the outer structure extends beyond the edge of the opening portion of the inner structure. A pressure-sensitive adhesive is used to re-adhere the marginal region to an underlying surface of the inner structure adjacent the opening through the laminate. The outer score line includes at least one tear portion that is torn through upon initial opening, thus indicating the package has been at least partially opened.

Avery Dennison in EP 2 323 921 B1 discloses a resealable container having an easily accessed yet airtight seal via the use of a tamper evident rupture strip which provides the container or package with improved shelf life for the product contained therein None of the prior-art documents uses an adhesive precursor composition that is converted upon request by a subsequent chemical reaction with crosslinking agents and/or modifiers into specific adhesive regions comprising adhesives having different specific bond/peel strengths.

Aim of the Invention

The present invention aims to provide an alternative to the existing packages with built-in opening and reclose feature and to a method for the production of the laminate presenting specific advantages over the above-mentioned prior art.

SUMMARY OF THE INVENTION

The present invention discloses a flexible laminate for forming a reclosable packaging container comprising a built-in opening and reclose feature, said laminate comprising an inner structure and an outer structure, adhesively joined face-to-face, the outer structure forming the outer surface of the container and the inner structure forming the inner surface of the container, the outer structure comprising an outer flap portion delimited by a scoring line through the outer structure, and an inner structure comprising an inner flap portion delimited by a scoring line through the inner structure, the inner score line and the outer score line creating an opening into the container when the flap portions are peeled back, a marginal region of the outer flap portion extending beyond an edge of the inner flap portion and overlying an underlying surface of the inner structure, the inner and outer flap portions being joined in a second adhesive region and the first adhesive region being disposed between the marginal region of the outer flap portion and the underlying surface of the inner structure for attaching and re-attaching, in use, the outer flap portion to the underlying surface, wherein the bond/peel strength, measured according to ASTM F904-1998 (reapproved 2008), of the first adhesive is smaller than the bond/peel strength of the second adhesive, the first adhesive being permanently tacky and covering the entire surface of either the inner structure or the outer structure, said first adhesive being patterned covered by one or more crosslinker(s), creating patterns of first adhesive region and second adhesive region, said second adhesive of the second adhesive region having a higher degree of crosslinking than said first adhesive of the first adhesive region.

Preferred embodiments of the present invention disclose one or more of the following features:

the bond/peel strength of the second adhesive region is at least 0.5 N/15 mm, preferably 1.0 N/15 mm, and more preferably 1.5 N/15 mm, higher than the bond/peel strength of the first adhesive region, measured according to a T-peel geometry at a speed of 100 mm/min and room temperature;

the bond/peel strength of the first adhesive region (2) should be lower than 1.3 N/15 mm, preferably lower than 1.1 N/15 mm, more preferably lower than 0.9 N/15 mm and the bond/peel strength obtained in the second adhesive region should be higher than 1.5 N/15 mm, preferably higher than 1.6 N/15 mm, more preferably higher than 1.8 N/15 mm and can be higher than 3.0 N/15 mm where the peel force represents the tear strength of one of the substrate layers, the values being measured according to a T-peel geometry at a speed of 100 mm/min and room temperature;

the adhesive comprises one or more (meth)acrylate copolymers or one or more polyurethane resins;

one of the inner or outer structures of the laminate comprises an adhesive-free region adjacent to the first adhesive region to create an opening-initiation zone;

one of the outer or inner structures has a greater affinity for bonding to the adhesive of the first adhesive region such that the adhesive remains entirely with one of the outer or inner structures when the flap portions are peeled back;

the outer structure includes a layer that is reverse-printed on a surface of the layer facing the inner structure;

the inner structure includes a barrier layer providing a barrier against the passage of at least one of moisture and oxygen;

the outer structure comprises a layer of polyethylene terephthalate or oriented polypropylene and the inner structure comprises a multi-layer web comprising:

a multi-layer web comprising a metallized polymer film, preferably a metallized oriented polypropylene and a heat-sealable material or, a heat-sealable multilayer web, preferably a heat-sealable metallized oriented polypropylene.

The present invention further discloses a reclosable packaging comprising the flexible laminate.

The present invention further discloses a method for making the flexible multilayer laminate, said method comprising the steps of:

applying a layer of adhesive precursor onto one surface of the inner or outer structure;

converting said adhesive precursor by a chemical reaction in the second region (3) and optionally in the first region (2) and creating patterns of first and second regions, the first adhesive region having a lower bond/peel strength than the second adhesive region and the first adhesive region being permanently tacky;

scoring the inner and outer structures by a scoring station before or after adhesively joining the inner structure to the outer structure face to face to form the laminate, an outer score line being formed through the thickness of the outer structure in registration with the outer perimeter of the first adhesive region, and an inner score line being formed through the thickness of the inner structure in registration with the inner perimeter of the first adhesive region.

Preferred embodiments of the method for making the flexible laminate of the present invention disclose at least one or a combination of the following steps:

the second adhesive region and the first adhesive region are patterned, and the position of the opening initiation is covered by a release layer or the position of the opening initiation is adhesive-free;

the patterned conversion of adhesive precursor into the first and second adhesive regions is obtained through the patterned addition of one or more crosslinking agents to a crosslinking agent free adhesive precursor or, if a blend of crosslinking agent and adhesive precursor is applied, through the patterned addition of one or more crosslink modifiers;

the adhesive precursor comprises one or more carboxyl groups or hydroxyl groups or acetoacetyl groups;

the crosslinking agent is a molecule comprising carbodiimide and/or isocyanate groups or a lower-alkoxylated amino formaldehyde;

treating one surface of the outer or inner structure with a corona or flame treatment to increase selectively the bonding affinity with the first adhesive such that the first adhesive tends to remain adhered to the treated surface when the opening portions are peeled back.

BRIEF DESCRIPTION OF THE DRAWINGS

FIG. 8 represents a side view of the lamination arrangement.

KEY

Figure 1:
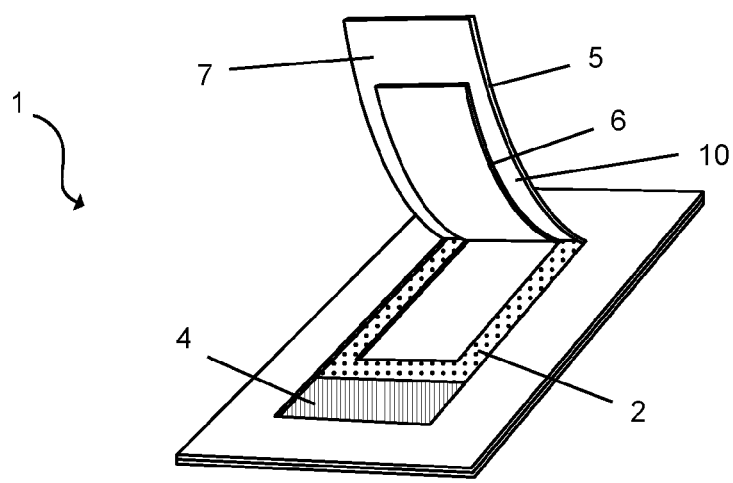
FIG. 1 is a view of the built-in opening and reclose feature with a first adhesive region surrounding the opening and a release-coating region or adhesive-free region, the permanently tacky adhesive remaining on the inner structure of the laminate after opening.
Figure 2:
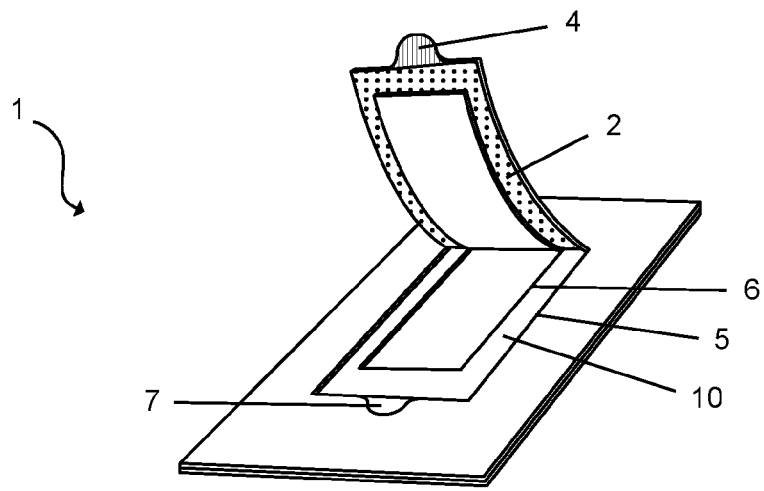
FIG. 2 is a view of the built-in opening and reclose feature with a first adhesive region and a release-coating region or adhesive-free region on the opening initiation (grasping portion), the permanently tacky adhesive remaining on the outer structure (flap) of the laminate after opening.
Figure 3:
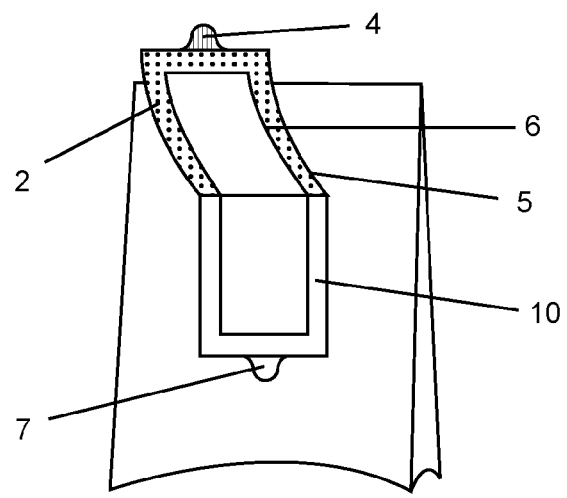
FIG. 3 is a view of a standing pouch comprising a built-in opening and reclose feature according to the invention, with the first adhesive region and the release-coating region or adhesive-free region positioned on the opening initiation, the permanently tacky adhesive remaining on the outer structure after opening.
Figure 4:
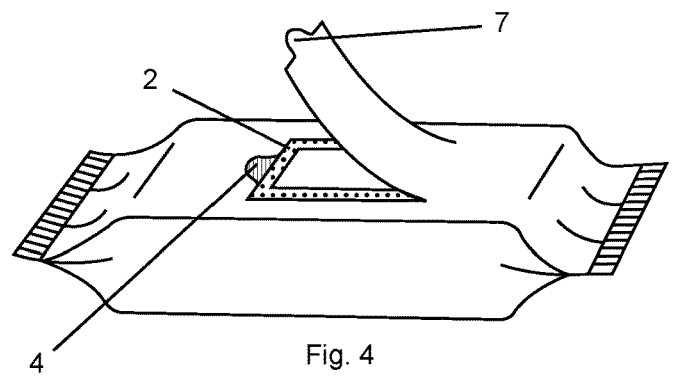
FIG. 4 is a view of a flow pack comprising a built-in opening and reclose feature according to the invention, with the first adhesive region and the release-coating region or adhesive-free region positioned on the opening initiation, the permanently tacky adhesive remaining on the inner structure after opening.

1. Built-in opening and reclose feature
2. First adhesive region (lower bond/peel strength) comprising the permanently tacky adhesive
3. Second adhesive region (higher bond/peel strength)
4. Release-coating layer or adhesive-free region for the opening initiation
5. Scoring line of the outer structure
6. Scoring line of the inner structure
7. Opening initiation in deactivated region (dead zone)
8. Outer structure of the laminate
9. Inner structure of the laminate
10. Marginal region
11. Barrier layer
12. Release layer applicator (optionally if required)
13. Adhesive precursor applicator
14. Oven
15. Crosslinking agent applicator
16. Crosslink modifier applicator
17. Scoring station (laser, kiss cutting . . . ) with eye mark/scoring coordination

DESCRIPTION OF THE INVENTION

The present invention discloses a flexible laminate structure suitable for forming a packaging container having a built-in opening and reclose feature 1, the laminate comprising a two-part structure, namely an outer structure 8 joined in face-to-face relation with an inner structure 9. The adjectives "inner" and "outer" are related to the position in the packaging container, the inner structure 9 being in contact with the content of the packaging container and the outer structure 8 being in contact with the environment. Inner and outer structures can also be named first and second structures of the laminate.

In general, the inner and outer structure are joined by means of adhesives, wherein the adhesive strength of the adhesive used for the reclosable built-in opening is different from the adhesive strength of the adhesive used for the remainder of the flexible laminate structure.

In prior art, the concept of "differential adhesion strength" on various substrates is always expressed as a binary terminology, referring to a "permanent adhesive" and a "pressure-sensitive adhesive".

In general, a pressure-sensitive adhesived structure is defined as a separable structure without breaking or rupturing any layer when peeling the structure. A permanent adhesived structure on the other hand, is not separable without breaking or rupturing any layer when peeling the structure.

Yet, the terminology "Pressure-sensitive adhesive" is jargon, commonly used and accepted in the industrial world, which actually is erroneous since all adhesives are pressure sensitive. The terminology that would have to be used in order to designate the so-called "pressure-sensitive adhesives" is "permanent tacky adhesives" since the latter adequately and properly expresses their characteristics. Such a permanently tacky adhesive can be used for repeatedly de-attaching and attaching different substrates such as an inner and an outer structure of a flexible laminate structure.

Likewise, the terminology "permanent adhesive" cannot be considered as an absolute concept; whether an adhesive is permanent or not will depend on various factors such as type of substrate, application method, temperature and ageing among others.

Because the expressions "permanent adhesives" and "pressure-sensitive adhesives" are not totally representative for the real life situations and because transition states between both may exist the present invention uses the terminology "first adhesive" and "second adhesive" wherein the bond/peel strength of the second adhesive is higher than the bond/peel strength of the first adhesive.

Within the context of the present invention, the term "first adhesive" stands for an adhesive with a first bond/peel strength and which is permanently tacky, while the term "second adhesive" stands for an adhesive with a second bond/peel strength, wherein the first bond/peel strength is lower than the second bond/peel strength, the difference between both being at least 0.5 N/15 mm measured according to a T-peel geometry at a speed of 100 mm/min and room temperature. and wherein both, the first adhesive and the second adhesive are obtained from the conversion of the same adhesive precursor by subjecting said common adhesive precursor to differential actinic irradiation.

The peel strength tests were inspired by ISO 11339, using a T-peel geometry, at room temperature. The tests were performed using an Instron™ tensile machine with a crosshead speed of 100 mm/min. The width of the tested strips was 15 mm, and the results are reported in N/15 mm. The sample is cut perpendicular to the extrusion direction.

With permanent tacky, the present invention means that the bond/peel strength after five consecutive de-attaching/attaching cycles does not decrease by more than 75%, preferable by not more than 60%, more preferably by not more than 50% or even not more than 40% of its initial value. It is obvious that the bond/peel strength values obtained in such tests is, for one type of first adhesive, dependent of the time interval between each de-attaching/attaching cycle, the pressure applied for re-attaching the flap, temperature at which the test is performed, the size of the marginal region 10 and the thickness of the first adhesive in the first adhesive region, among others. In the present invention the flexible laminate is stored at room temperature for the whole test and the test is repeated in intervals of one hour. The pressure for re-attaching the flap is exerted by pushing the thumb and forefinger against each other.

Although the rupture of facing layers largely depends on their tear strength, it is generally admitted, within the context of the present invention that the bond/peel strength obtained by the first permanently tacky adhesive should be lower than 1.3 N/15 mm, preferably lower than 1.1 N/15 mm, more preferably lower than 0.9 N/15 mm to avoid rupturing the facing layer.

The second adhesive cannot be used for opening and reclose features. The bond/peel strength obtained by the second adhesive should be higher than 1.50 N/15 mm, preferably higher than 1.6 N/15 mm, more preferably higher than 1.8 N/15 mm and can be as high as 3.0 N/15 mm where the peel force represents in fact the tear strength of one of the layers.

Within the context of the present invention the "adhesive precursor" is generally converted into the first or into the second adhesive . . . . However, the adhesive precursor can be a permanently tacky first adhesive as such without necessity of a chemical modification.

Conversion of the adhesive precursor is performed through a temperature activated reaction between the adhesive precursor and one or more crosslinking agents. By "thermally activated", the present invention means that the reaction between the adhesive precursor and the one or more crosslinking agents proceeds at room temperature or higher temperature.

According to the present invention, a "first region" means a region comprising a first adhesive having a first bond/peel strength and a "second region" means a region comprising a second adhesive with a second bond/peel strength wherein the first region is a patterned region containing the adhesion precursor as such, or is a region obtained from reaction of a first patterned metered stoichiometry of crosslinking agent and the adhesive precursor.

Similarly, the second region is obtained from reacting a second patterned metered stoichiometry of crosslinking agent and adhesive precursor wherein the stoichiometric ratio of the functional groups of the one or more crosslinking agents over the functional groups of the adhesive precursor is higher according to the second pattern than according to the first pattern and wherein said ratio according to the second pattern is less than 2, preferably less than 1.5, more preferably less than 1 and most preferably less than 0.7 or even 0.5. Preferably, the ratio according to the first pattern equals 0.

After reaction, the degree of crosslinking of the first adhesive of the first region is lower than the degree of crosslinking of the second adhesive of the second region. The degree of crosslinking may be determined by using for example mid and near infrared spectroscopic techniques, well known in the art.

In a first embodiment, a different stoichiometric ratio is obtained by providing different amounts crosslinking agents to the adhesive precursor according to the different patterns: thus less crosslinking agent is added to the adhesive precursor according to the first pattern relative to the amount of crosslinking agent added according to the second pattern. Upon reaction, the first pattern is converted into the first region 2 and the second pattern into the second region 3.

In a preferred first embodiment, the first adhesive is the adhesive precursor: no crosslinking agent is added according to the first pattern.

In a second embodiment, the different stoichiometric ratio is obtained through the monitored metered addition of one or more mono-functional organic compounds, having a functional group, reactable with the functional groups of the crosslinking agent, according to the first pattern and according to the second pattern, both patterns comprising a blend of adhesive precursor and crosslinking agent.

In general, the concentration of said mono-functional organic compound, further called the crosslink modifier, is higher for the first pattern than for the second pattern. Preferably, the amount of crosslink modifier, added according to the second pattern, equals zero.

In general, contacting the adhesive precursor with one or more crosslinking agents and/or one or more crosslink modifiers according to a first pattern will result, after reaction, in a first adhesive region comprising adhesive precursor in contact with the surface of the inner structure 9 wherein part of the layer thickness (outer part) of said adhesive precursor is transformed into the first adhesive. Similarly, contacting the adhesive precursor with one or more crosslinking agents and/or one or more crosslink modifiers according to a second pattern will result, after reaction, in a second adhesive region comprising adhesive precursor in contact with the surface of the inner structure 9 wherein part of the layer thickness (outer part) of said adhesive precursor is transformed into the second adhesive.

In the preferred first embodiment, the adhesive precursor is the first adhesive and one or more crosslinking agents are applied on the first adhesive according to a second pattern. Upon reaction between the first adhesive and the crosslinking agent, part of the layer thickness (outer part) of said first adhesive is transformed into the second adhesive, the first adhesive being in contact with the surface of the inner structure 9.

The preferred first embodiment thus results in an inner structure entirely covered with first adhesive except optionally at the location of the opening initiation and except for second adhesive region wherein part of the layer thickness of said first adhesive is transformed into second adhesive according to the second pattern and except the opening initiation having release coating on top of the first adhesive or is adhesive-free in order to facilitate the opening of the reclosable flap.

At least one of both structures (8, 9) comprises the adhesive precursor on its surface. The conversion of the adhesive precursor into the second region 3 and the optional conversion into the first region 2 is performed on request before or after joining both structures (8, 9).

The selective conversion of the adhesive precursor has the advantage that first 2 and second 3 regions never cover each other.

The inner and outer structures (8, 9) of the laminate include usual lamination structures. The outer structure generally exhibits a printable polymer layer, sometimes associated to a paper layer. Reverse printing is often preferred. Barrier layer 11 such as oriented polyamide (OPA) or ethylene vinyl alcohol copolymer (EVOH), aluminium foils and the like are usual constituents. The inner structure 9 often comprises a polyolefin seal layer, sometimes associated to support layer, among them oriented polymers like OPP, OPA, OPET, . . . Substantially all combinations are possible and well known by those skilled in the art.

The number of constituents of a laminate are mainly governed by their specific function in the laminate, by lamination facilities and by price considerations. Technically, almost all combinations are possible.

A score line, defined here as a line of weakness or a trough cut, is formed in the outer structure (outer score line 5) to define an outer opening portion and an inner line of weakness or a trough cut is formed in the inner structure (inner score line 6) to define an inner opening portion. The outer and inner opening portions are attached to each other in a second adhesive region 3, except in the marginal region 10 that extends beyond the peripheral edge of the inner opening portion between the outer and inner cut or weakening lines, and corresponds to a first pattern defining the first adhesive region (permanent tacky region) 2 to respond to the permanent tackiness feature of the opening and reclosure feature.

The bond/peel force of the first 2 and the second 3 region can be tuned on demand by a patterned metered monitoring of the conversion of the adhesive precursor through reaction with one or more crosslinking agents, for example by means of the patterned metered addition of one or more crosslinking agents or one or more crosslink modifiers to the adhesive precursor. The adhesive precursor can even be totally passivized into a dead zone where no adhesion remains at all. Such a zone can be used as opening initiation for the reclosable flap.

As far as the outer and inner opening portions are connected by an adhesive having the highest bond/peel strength in the second region 3, they can be lifted out of the plane of the built-in opening as a flap, thereby creating an opening through the packaging structure defined by the inner line of weakness (see FIGS. 1 to 6).

After a first opening, the flap created by the connection of the inner and outer portions can be reclosed by adhering the marginal region 10 of the outer opening portion to the underlying portion of the inner structure 9 via the adhesive with the lowest bond/peel strength in the first adhesive region 2. This permanent tacky adhesive in region 2 can be positioned on the outer or the inner structure (8, 9), by increasing the affinity to it of the underlying substrate via a corona treatment for instance. Both positions having their advantages and drawbacks. Positioned on the inner structure 9, the permanent tacky adhesive in region 2 is often rapidly contaminated by the content of the package, such as confectionery articles or biscuits, etc. Positioned on the outer structure 8, the permanent tacky adhesive in region 2 is possibly passivized by finger contact. The choice of the position of the permanent tacky adhesive (lowest bond/peel strength) is therefore conditioned by the content of the packaging and the requirements of the end-user.

The adhesive precursor of the present invention may be applied onto the entire surface of the inner structure 9 or of the outer structure 8 by any suitable coating process known to those of ordinary skill in the art, for example by direct gravure coating, reverse gravure coating, offset gravure coating, smooth roll coating, curtain coating, slot coating, spin coating, screen coating, transfer coating, brush or roller coating, air-knife coating, spray coating and combinations thereof. The direct gravure process is preferred. Prior to the application of the adhesive precursor the surface can be treated by corona discharge or flame treatment to increase the affinity of the surface to the first adhesive obtained from conversion of the adhesive precursor.

The thickness of a coated adhesive precursor layer, provided in liquid form, prior to reaction, can be any thickness that results in the desired properties, as is well understood in the art. Exemplary thicknesses of an uncured, curable adhesive precursor layer may be in the range from about 0.1 to about 20 µm, preferably from about 0.5 to about 15 µm more preferably from about 1 to 10 µm and most preferably from about 2 to about 8 µm.

The layer thickness of the first adhesive in the first adhesive region 2 can be slightly higher than the layer thickness of the first adhesive layer in the second adhesive region 3, in order to compensate for the layer thickness of the crosslinking agent contacted to the first adhesive in the second adhesive region 3.

According to the first embodiment, the method for making the flexible laminate of the present invention, comprises the steps of:
  providing an adhesive precursor, preferably a liquid adhesive precursor, onto the entire surface of the inner structure 9;
  contacting one or more crosslinking agents according to the second pattern on the adhesive precursor;
  optionally contacting one or more crosslinking agents according to the first pattern on the adhesive precursor;
  reacting the adhesive precursor and the one or more crosslinking agents; and
  laminating the outer structure 8 to the inner structure 9;
wherein the concentration of the one or more crosslinking agents, provided according to the first pattern is lower than the concentration of the one or more crosslinking agents provided according to the second pattern. Preferably, the concentration of crosslinking agents provided according to the first pattern equals zero.

The one or more crosslinking agents may be diluted in for example adhesive precursor in order to facilitate the administration of said one or more crosslinking agents to the appropriate concentration (masterbatch).

According to the second embodiment, the method for making the flexible laminate of the present invention, comprises the steps of:
  providing an adhesive precursor, preferably a liquid adhesive precursor, onto the entire surface of the inner structure 9 (with the optional exception of the opening initiation area not covered by the precursor);
  contacting one or more crosslinking agents according to the second pattern on the adhesive precursor;
  optionally contacting one or more crosslinking agents according to the first pattern on the adhesive precursor;

contacting one or more crosslink modifiers according to the first pattern on the adhesive precursor comprising the one or more crosslinking agents;

optionally contacting one or more crosslink modifiers according to the second pattern on the adhesive precursor comprising the one or more crosslinking agents;

reacting the adhesive precursor, the one or more crosslinking agents and the one or more crosslink modifiers; and laminating the outer structure 8 to the inner structure 9.

A variant of the second embodiment consists in mixing the adhesive precursor and the one or more crosslinking agents before applying it to the structure, said mixture then being provided onto the entire surface of the inner structure and being patterned contacted with crosslink modifiers (with the optional exception of the opening initiation area not covered by the precursor).

The method of the present invention is characterized in that the overall thickness of the first and the second adhesive regions are substantially the same despite a difference in thickness over the section of the laminate web can be contemplated to obtain a higher bond/peel strength in the reclosing area (for example 2.5 g/cm$^2$ for higher bon/peel strength and 4.5 g/cm$_2$ for the permanently tacky reclosing area).

The different embodiments of the present invention may provide a release-coating layer 4, covering the opening initiation 7, pattern applied onto the inner structure according to a third pattern corresponding to the opening initiation 7.

It is obvious that in the different embodiments of the method of the present invention, the adhesive precursor may be applied either on the inner or on the outer structure.

When solvent or water based adhesive precursors are used, drying means such as ovens or infra-red heaters can be used, allowing the applied adhesive precursor to be in good condition for the next manufacture step (lamination or application of one or more crosslinking agents, one or more crosslink modifiers and/or release-coating).

The inner and the outer structures (8, 9) are preferably supplied from rolls and substantially have the same width. Once laminated face to face, both structures form a laminate that is a continuous web to be supplied to the final packaging station.

One or both of the inner and the outer structures (8, 9) or the adhesively assembled laminate are then scored at a scoring station where an outer score line 5 is formed through the thickness of the outer structure 8 in registration with the outer perimeter of the first region 2 and possibly releasecoating layer 4 if an opening initiation 7 is present, and an inner score line 6 is formed through the thickness of the inner structure 9 in registration with the inner perimeter of the first region 2. The score lines (5, 6) can be formed by laser scoring, die cutting or kiss cutting, or any other available method well-known in the art. The position of the scoring station, in case of laser scoring, is principally conditioned by the presence or not of a barrier layer that is able to stop or to reflect the laser beam.

To maintain the outer and inner score lines 5 and 6 in registration around the region 2 and release layer pattern 4 (outer and inner perimeters of both), the scoring operation is synchronized with the advancement of the laminate by means of an optical sensor detecting an eye mark sequence on the laminate, whose location in relation to first region 2 and release-coating layer 4 pattern is known. Since tolerances are unavoidable, it is preferable to have the first adhesive region (permanently tacky region) going slightly beyond the outer perimeter of the outer score line 5 than having the second region 3 extending over the outer score line, into the marginal region 10 of the reclosable flap.

In case of laser cutting, the depth and width of the score line can be adjusted by regulating the power output of the beam and the residence time of a given spot on the film surface. These parameters are selected in combination with the material to be scored. Some materials are more receptive than others to laser energy—see for instance U.S. Pat. Nos. 3,909,582 and 5,158,499 giving extensive information on laser-cutting technology.

Furthermore, various combinations of mechanical and laser scoring are possible. One possibility is for instance to laser-score one side of the laminate and to mechanically cut the other side if one of both structures is not laser-scorable, for instance in the case of a non-absorbing seal layer, such as polyethylene without reflective barrier layer behind.

In the final laminate, the outer opening portion bonded by the adhesive in the second adhesive region 3 to the inner opening portion is peelable from the underlying surface of the inner structure 9 allowing both portions to be peeled back and to create a reclosable opening. The marginal region 10 formed between the outer and inner score lines (5, 6) on the outer opening portion (first permanently tacky adhesive region 2), is re-attachable to an underlying surface of the inner structure 9.

The inner structure 9 of the laminate comprises one or more of a sealant or support layer(s) forming the inner surface of the laminate. Sealant layers are well known in the art and comprise heat-seal material such as heat-seal lacquer, LDPE, HDPE, EVA, polypropylene, polyolefin copolymers in general, ionomers or cold-seal materials.

The inner and the outer structures (8,9) can also comprise one or more barrier layer(s) known in the art such as metallized polyolefin films, for instance metallized oriented polypropylene (oPP), ethylene vinyl alcohol copolymer (EVOH), oriented polyamide (oPA). Other possibilities are ceramic-coated films like AlOx or SiOx—coated polymer films or aluminium foil.

The outer structure comprises one or more of the following layers:

oriented polypropylene (oPP, 10-100 µm, preferably 15-40 µm);

high-density polyethylene (HDPE, 10-100 µm, preferably 15 to 40 µm);

polystyrene (PS, 10-100 µm, preferably 15-40 µm);

oriented polyamide (oPA, 10-100 µm, preferably 10-40 µm);

polyester such as polyethylene terephthalate (PET, 10-100 µm, preferably 10 to 40 µm);

paper.

The second layer of the outer structure 8 can be printed outside or reverse-printed.

All the layers of the inner and outer structures (8, 9) can be laminated by means of adhesives or coextruded with possible tie layer if necessary. The methods for all possible combinations are known in the art.

In the lamination process, the outer structure 8 is provided from a supply roll to a print station for printing graphics and/or indicia on it (not shown). This can be achieved by means of a rotogravure printer. In a preferred embodiment of the invention, the outer structure 8 includes a transparent PET layer or oriented polypropylene that is reverse-printed, which means that the inks are applied to the surface of the PET layer, which is subsequently laminated to another structure, the inks are visible through the outer structure by transparency.

The surface of the outer structure 8 can be treated by corona discharge or flame treatment just prior to printing in the print station or even in an earlier production step. The corona treatment is typically used in the art to render the surface more receptive to the inks and to create a privileged affinity to the permanent tacky adhesive to manage the side where the adhesive has to remain after opening the flap (inner or outer layer).

The present invention is particularly applicable for flexible laminates wherein the inner layer of the outer structure 8 is a metallized or a metal layer.

For the particular case where the adhesive precursor is applied onto the entire surface of the outer structure, the present invention is particularly relevant for flexible laminates wherein the outer layer of the inner structure 9 is a metallized or a metal layer.

The inner or outer structure is submitted to application stations for adhesive precursor, crosslinking agent, crosslink modifier and release coating formulation.

The adhesive precursor of the present invention comprises one or more polymer(s) and/or oligomer(s) comprising one or more reactive sites, one or more tackifiers and additives for example antioxidants, wetting agents, flowing agents and/or any other additive(s) which are known to those skilled in the art.

The one or more polymer(s) and/or oligomer(s) of the present invention comprise a(n) (meth)acrylate-, rubber-, silicone-, urethane-, ester-, ether-structure or a combination of them, comprising one or more hydroxyl-, carboxyl-, or acetoacetyl-groups.

The adhesive precursor preferably used in the present invention comprises a hydroxyl-functional polyurethane resin or a carboxyl- and/or hydroxyl- and/or acetoacetyl-functional (meth)acrylic (co)polymer.

Preferably the hydroxyl-functional polyurethane is obtained from reaction of a stoichiometric excess of one or more polyols with one or more polyisocyanates.

Examples of polyols are polyester polyols, polyesteramide polyols, polyamide polyols, polyether polyols, silicon comprising polyols and rubber polyols having a number averaged molecular weight comprised between 500 and 15,000 g/mole, preferably between 1000 and 10,000 g/mole, more preferably between 2,000 and 8,000 g/mole.

Examples of polyester polyols, polyesteramide polyols and polyamide polyols are preferably obtained from saturated or unsaturated polycarboxylic acids and saturated and unsaturated polyhydric alcohols, aminoalcohols, diamines, polyamines and the like. Suitable carboxylic acids for preparing these polyesters include, for example, adipic acid, succinic acid, phthalic acid and the like. Polyhydric alcohols useful in preparing the polyesters include, for example, ethylene glycol, 1,2-propylene glycol, 1,4-butanediol, neopentyl glycol, hexanediol, trimethylolpropane and the like. Aminoalcohols, for example, ethanol amine are used for the synthesis of polyester amide diols, while diamines such as ethylene diamine, hexamethylene diamine ere used for the synthesis op polyamide diols.

Examples of polyether diols are, for example, the condensation products of ethylene oxide, propylene oxide, butylene oxide, tetrahydrofuran and the copolymerization, graft or block polymerization products thereof.

Examples of rubber diols are, for example, polybutadiene derived polyol(s); hydrogenated polybutadiene derived difunctional polyol(s); poly(ethylene/butylene) derived difunctional polyol(s); copolymer of butadiene-acrylonitrile derived difunctional polyol(s), or copolymer of styrene-butadiene-styrene derived difunctional polyol(s), or styrene-isoprene-styrene derived difunctional polyol(s), or copolymer of styrene-ethylene/butylene-styrene derived difunctional polyol(s), or copolymer of styrene-ethylene/propylene-styrene derived difunctional polyol(s), non-crystalline polyether glycol(s).

Examples of silicon comprising polyols are hydroxyl-functional silanes and siloxanes.

Examples of polyisocyanates are isophorone diisocyanate; 2,4 toluene diisocyanate; 2,6 toluene diisocyanate; 4,4-diphenylmethane diisocyanate; 4,4'-diphenyldimethane diisocyanate; di- and tetra-alkyldiphenylmethane diisocyanates and the like.

The (meth)acrylic copolymer or oligomer having carboxyl and/or hydroxyl and/or acetoacetyl functional group(s) is for example obtained from the polymerization of (meth)acrylate alkyl ester having from 2 to 26 carbon atoms in the alkyl group, such as for example ethyl(meth)acrylate, propyl(meth)acrylate, n-butyl(meth)acrylate, isobutyl(meth)acrylate and (meth)acrylic monomers comprising an acid group such as (meth)acrylic acid or an hydroxyl group such as hydroxyethyl(meth)acrylic or hydroxypropyl(meth)acrylate or an acetoacetyl group such as acetoacetoxyethyl methacrylate.

Optionally, the (meth)acrylic copolymer or oligomer, having carboxyl or hydroxyl functional group(s), comprises one or more ethylenically unsaturated monomer(s) different from (meth)acrylic monomer(s) such as for example styrene, α-methylstyrene, vinyltoluene, acrylonitrile, vinyl acetate, vinyl propionate, acrylamide and vinyl chloride.

Crosslinking agents preferably used are polyisocyanate, carbodiimide, or lower-alkoxylated amino formaldehyde crosslinking agents. The carbodiimide crosslinking agent preferably used the present invention essentially consists of a condensate through decarboxylation reaction between one or more isocyanates wherein the condensate may be blocked with a hydrophilic group at terminal isocyanate groups thereof.

Examples of polyisocyanates used in the preparation of the carbodiimides are hexamethylene diisocyanate, hydrogenated xylylene diisocyanate, xylylene diisocyanate, 2,2, 4-trimethylhexamethylene diisocyanate, 1,12-diisocyanatododecane, norbornane diisocyanate and 2,4-bis-(8-isocyanatooctyl)-1,3-dioctyl cyclobutane, 4,4'-dicyclohexylmethane diisocyanate, tetramethylxylylene diisocyanate and isophorone diisocyanate.

The isocyanates preferably used in the present invention are selected from those used for the synthesis of the polyurethane resins and those used for the preparation of the carbodiimide crosslinking agents as disclosed earlier.

Examples of lower-alkoxylated amino formaldehyde crosslinking agents preferably used in the present invention are lower-alkoxylated amino formaldehyde condensates having C1-4 alkyl groups such as hexamethoxymethyl melamine, tetra butoxymethyl urea or tetramethoxymethyl urea.

Crosslinking agents in general are provided to the adhesive precursor in an amount ranging from 1 to 35% by weight, preferably from 3 to 30% by weight, more preferably from 5 to 25% by weight, of the total weight of the one or more polymer(s) and/or oligomer(s) comprising one or more reactive sites and crosslinking agents.

Examples of crosslink modifiers comprise monofunctional C3-C30 (cyclo)aliphatic compounds, (cyclo)aliphatic organic compounds comprising a carboxylic acid group such as n-heptanoic acid, isononanoic acid, isoundecane carboxylic acid, cyclohexanecarboxylic acid, a hydroxyl group such as n-nonyl alcohol, stearyl alcohol, n-tricontanol or an amine group such as cyclohexyl amine, iso-octyl amine, n-hexadecyl amine.

Crosslink modifiers in general are provided to the adhesive precursor comprising one or more crosslinking agents in an amount ranging from 1 to 20% by weight, preferably from 3 to 15% by weight, more preferably from 5 to 10% by weight, of the total weight of the one or more polymer(s) and/or oligomer(s), the one or more crosslinking agents and the one more crosslink modifiers.

The adhesive precursor of the present invention further comprises one or more tackifiers selected from the group consisting of emulsified rosin, partially decarboxylated rosin, glyceryl esters of polymerised rosin, partially dimerised rosin, natural resins, hydrogenated wood rosin, plasticised hydrogenated rosin, aliphatic and/or cycloaliphatic hydrocarbon resins; aliphatic hydrocarbon resins from petroleum, aromatic petroleum resins, hydrogenated aromatic resins; mixed aromatic/aliphatic resins, Ethylene Vinyl Acetate copolymers, (meth)acrylate (co)polymers, terpene resins, terpene/phenol resins, cumarone/indene resins, rosin esters, pentaerythritol esters and polydicylopentadiene resins, and modified hydrocarbon tackifier resins.

The adhesive precursor of the present invention comprises from about 5% to about 80% by weight, preferably from about 15% to about 65% by weight, more preferably from about 20% to about 50% by weight, of one or more tackifier(s).

The adhesive precursor further comprises from 0% to about 8% of one or more wetting agent(s); from 0% to about 15% of one or more plasticizer(s); from 0% to about 10% of one or more antioxidant(s); from 0% up to about 40% by weight of one or more colorant(s) and from 0% up to about 12% of one or more rheology modifier(s).

The first adhesive region 2 forms viscoelastic bonds that are permanently tacky and adhere under simple finger pressure.

The adhesive precursor and release-coating layer 4 applying stations (12, 13) are complemented by drying means such as ovens or infra-red heater for instance, allowing the applied adhesives to be in good condition for the next manufacture step (application of crosslinking agents, crosslink modifiers, lamination).

The flexible laminate of the invention comprising a built-in open and reclose feature made as in the invention provides a tamper-evidence function because it is very difficult to replace the opening portions after initial opening exactly on the same place as before the opening. When the outer layer of the outer structure 8 is printed, in particular if it is reverse printed, it is almost impossible to achieve perfect registration of the printed matter across the score line when reclosing the package. Alternatively, a tamper-evidence function is provided through an interruption of the inner and/or outer score line (no score line at the interruption), so that after initial opening, the inner and/or outer structure(s) are partially damaged at said interruption through which the first opening of the flap is clearly visible.

Figure 5:
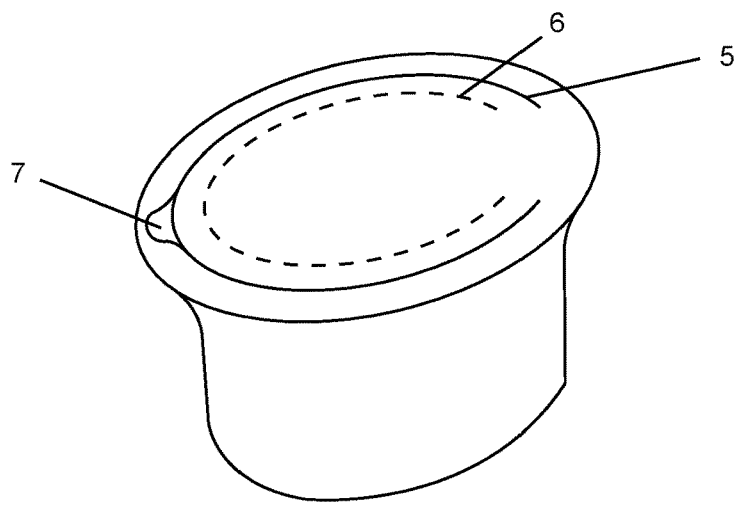
FIGS. 5 and 6 show a tray comprising a built-in opening and reclose arrangement according to the invention on its lid. The first adhesive region and the release-coating region or adhesive-free region on the opening initiation, the permanently tacky adhesive remaining on the outer structure after opening.
Figure 6:
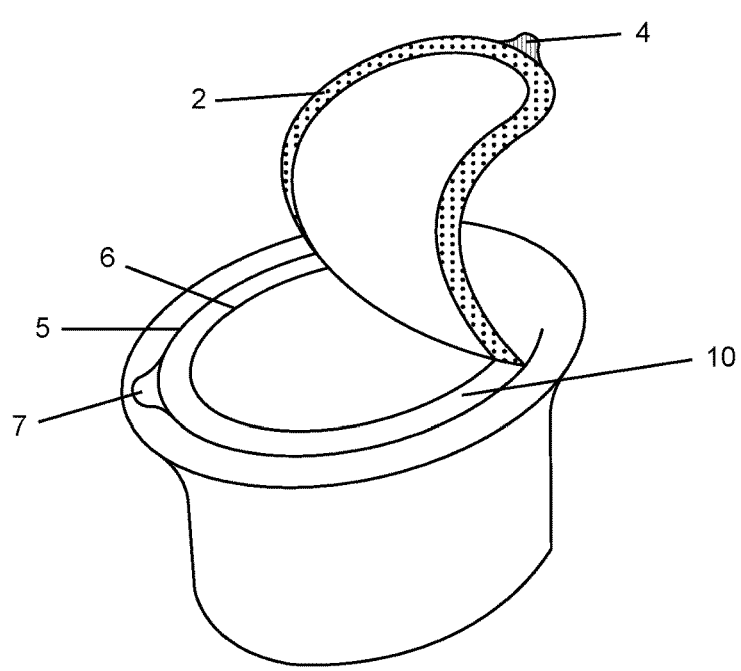
Figure 7:
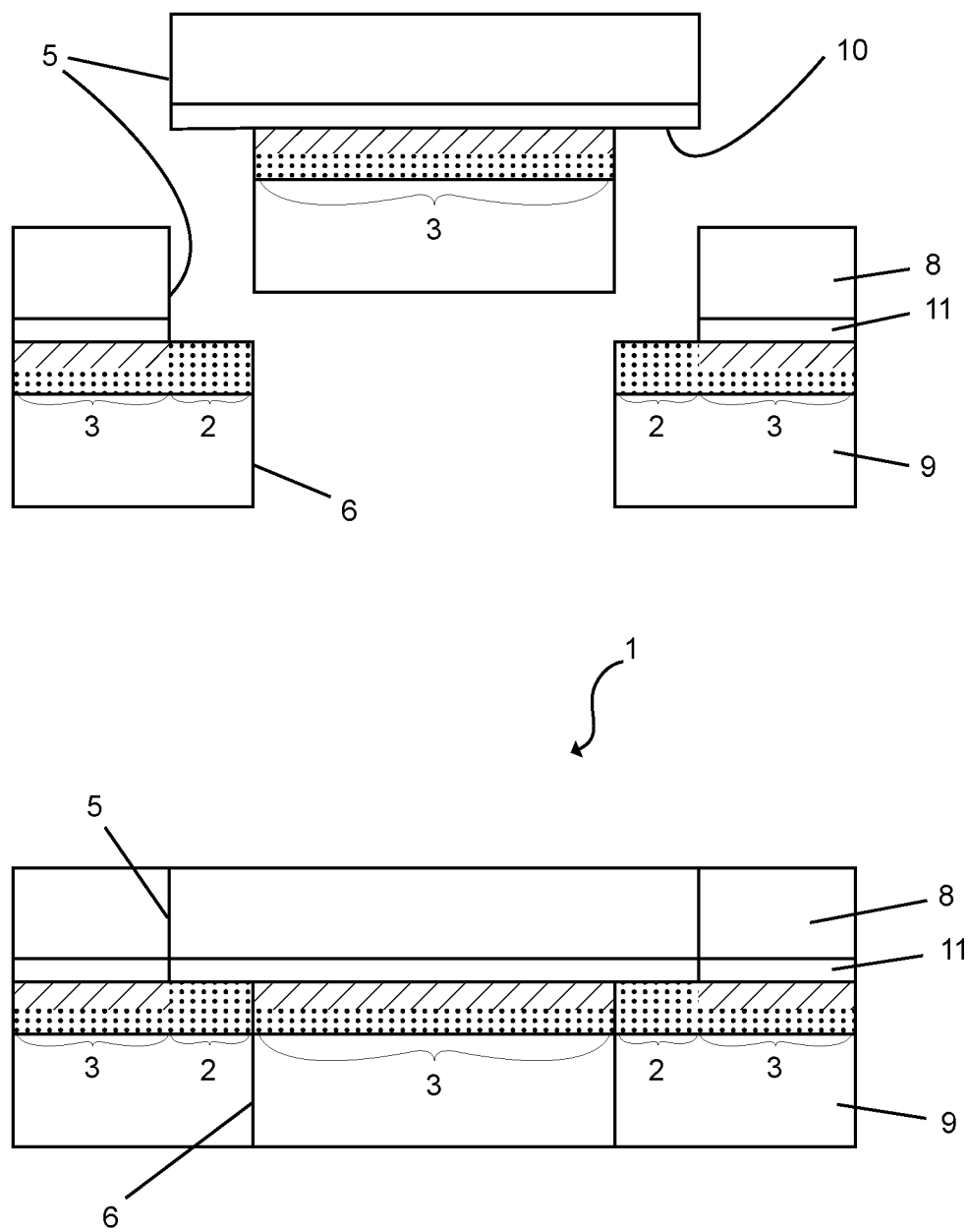
FIG. 7 represents a profile view of the built-in opening and reclose feature in open and closed positions. In this particular case, the precursor transformation into the high bond/peel strength region 3 was performed on the side of the outer structure but this transformation can also be contemplated on the side of the inner structure (not represented).

The flexible laminate of the invention not only can be used for flow packs or pouches (FIGS. 3 and 4) but also for lidding of tray or other container (FIGS. 5 and 6). In this manner, the lid includes a built-in reclosable opening.

EXAMPLES

The following illustrative examples are merely meant to exemplify the present invention but are not destined to limit or otherwise define the scope of the present invention.

Examples 1 and 2 correspond to the embodiments as shown in FIG. 8 and was performed under the following conditions:
Duplex Structure Example 1

A structure of a white pigmented, oriented polypropylene film (WTD from Treofan Germany GmbH & Co. KG) is printed by means of solvent containing polyvinylbutyral colors (PVB from Siegwerk Druckfarben AG & Co. KGaA). A protection layer of polyamide (Release lacquer 10-609345-3 of Siegwerk Druckfarben AG & Co. KGaA) is then applied on the printed surface.
Adhesive precursor Acronal N 286 (BASF) is then applied at a film thickness of 5 μm over the entire surface of the print-free side of the propylene film except for the opening initiation region.
Basonat DS 3582 (BASF) was then applied onto the adhesive precursor Acronal N 286 in an amount of 0.25 g/m$^2$ over the entire surface of the adhesive precursor except for the U-shaped patterns.
Subsequently, a metallized foamed polypropylene film (QCM from Treofan Germany GmbH & Co. KG) is then adhesive laminated, with the metallized side contacting the adhesive, to create a duplex structure.
After a dwell time of 200 hours at room temperature and after laser perforation, the bond/peel strength was measured for the first adhesive region comprising Acronal N 286 and for the second adhesive region comprising a layer of Acronal N 286 wherein part of said layer has been converted through reaction of the carboxylic acid groups of Acronal N 286 with the carbodiimide crosslinking agent.
The bond/peel strength corresponding to the first adhesive regions is 0.7 N/15 mm and permanently tacky, while the bond/peel strength corresponding to the second adhesive region is 1.6 N/15 mm, according to a T-peel geometry at a speed of 100 mm/min and room temperature.
On the backside of the metallized foamed polypropylene, a further cold seal (Naturlex Kautschuk Emulsion—Cold seal S 8085 von Sun Chemical) is pattern applied for the cross and longitudinal seal of the future pack (not represented).

Example 2

To the oriented polypropylene film structure as in example 1, a 80/20 blend of Bayhydrol XP 2591 (Bayer) and Acronal A 107 (BASF) is applied as in example 1 at a film thickness of 5 μm.
After flashing off the water in an infrared over, Basonat LR 9056 (BASF) is applied at 0.20 g/m$^2$ over the entire surface of the adhesive precursor except for the U-shaped patterns.
A metallized foamed polypropylene film (QCM from Treofan Germany GmbH & Co. KG) is then adhesive laminated, with the metallized side contacting the adhesive, to create a duplex structure. After a dwell time of 200 hours and after laser perforation, the bond/peel strength corresponding to the first adhesive regions, comprising the 80/20 blend of Bayhydrol XP 2591/Acronal A 107, is 1 N/15 mm, while the bond/peel strength corresponding to the second adhesive region, comprising a layer of Bayhydrol XP 2591/Acronal A 107 wherein part of said layer has been converted through reaction of the hydroxyl-groups with hexamethylene diisocyanate, is 1 N/15 mm, according to a T-peel geometry at a speed of 100 mm/min and room temperature.

In a subsequent experiment, the bond/peel strength of the first adhesive regions was measured after consecutive de-attaching—attaching cycles. After five cycles, a 30 to 50% decrease of the original bond/peel strength value was measured.

Laser Perforation (ROFIN-BAASEL Lasertech Equipment)

The laser perforation of the duplex structure can performed according to numerous embodiments, depending on the available laser equipment. Preferred embodiments are:
  cut inline on both sides of the duplex laminate structure;
  separately cut inline the first and second structures before both structures are adhesive laminated to a duplex structure;
  cut inline one of both structures before the adhesive lamination of both structures followed by the adhesive lamination step and then by the cut of the second structure.

After laser cut of the duplex structure to create the built-in opening and reclose feature for the reclosable packaging of the present invention, the duplex structure is cut into the right width and wound on rolls with the printed layer oriented outside.

All examples can additionally be equipped on the duplex structure with a cold seal on specific positions to seal the finished pack. The used cold seal is S 8085 of Sun Chemical (this step is not represented in the figures).

The invention claimed is:

1. A flexible laminate for forming a reclosable packaging container comprising a built-in opening and reclose feature, said laminate comprising an inner structure and an outer structure, adhesively joined face-to-face, the outer structure forming the outer surface of the container and the inner structure forming the inner surface of the container, the outer structure comprising an outer flap portion delimited by a scoring line through the outer structure, and an inner structure comprising an inner flap portion delimited by a scoring line through the inner structure, the inner score line and the outer score line creating an opening into the container when the flap portions are peeled back, a marginal region of the outer flap portion extending beyond an edge of the inner flap portion and overlying an underlying surface of the inner structure, the inner and outer flap portions being joined in a second adhesive region and the first adhesive region being disposed between the marginal region of the outer flap portion and the underlying surface of the inner structure for attaching and re-attaching, in use, the outer flap portion to the underlying surface, wherein the bond/peel strength, measured according to ASTM F904-1998 (reapproved 2008), of the first adhesive is smaller than the bond/peel strength of the second adhesive, the first adhesive being permanently tacky and covering the entire surface of either the inner structure or the outer structure, said first adhesive being patterned covered by one or more crosslinker(s), transforming a part of the layer thickness of said first adhesive into the second adhesive and creating patterns of first adhesive region and second adhesive region, said second adhesive of the second adhesive region having a higher degree of crosslinking than said first adhesive of the first adhesive region.

2. The flexible laminate as in claim 1, wherein the adhesive comprises one or more (meth)acrylate copolymers or one or more polyurethane resins.

3. The flexible laminate as in claim 1, wherein one of the inner or outer structures of the laminate comprises an adhesive-free region adjacent to the first adhesive region to create an opening-initiation zone.

4. The flexible laminate as in claim 1, wherein one of the outer or inner structures has a greater affinity for bonding to the adhesive of the first adhesive region such that the adhesive remains with one of the outer or inner structures when the flap portions are peeled back.

5. The flexible laminate as in claim 1, wherein the outer structure includes a layer that is reverse-printed on a surface of the layer facing the inner structure.

6. The flexible laminate as in claim 1, wherein the inner structure includes a barrier layer providing a barrier against passage of at least one of moisture and oxygen.

7. The flexible laminate as in claim 1, wherein the outer structure comprises a layer of polyethylene terephthalate or oriented polypropylene and the inner structure comprises:
  a multi-layer web comprising a metallized polymer film, or,
  a heat-sealable multilayer web.

8. The flexible laminate as in claim 1, wherein the outer structure comprises a layer of polyethylene terephthalate or oriented polypropylene and the inner structure comprises:
  a multi-layer web comprising a metallized polymer film in the form of a metallized oriented polypropylene and a heat-sealable material or,
  a heat-sealable multilayer web if the form of a heat-sealable metallized oriented polypropylene.

9. The flexible laminate of claim 1, wherein the bond/peel strength of the second adhesive region is at least 0.5 N/15 mm higher than the bond/peel strength of the first adhesive region, measured according to a T-peel geometry at a speed of 100 mm/min and room temperature).

10. The flexible laminate of claim 9, wherein the bond/peel strength of the second adhesive region is at least 1.0 N/15 mm higher than the bond/peel strength of the first adhesive region.

11. The flexible laminate of claim 9, wherein the bond/peel strength of the second adhesive region is at least 1.5 N/15 mm, higher than the bond/peel strength of the first adhesive region.

12. The flexible laminate as in claim 1 wherein the bond/peel strength of the first adhesive region is lower than 1.3 N/15 mm, and the bond/peel strength obtained in the second adhesive region is higher than 1.5 N/15 mm, where the peel force represents the tear strength of one of the substrate layers, the values being measured according to a T-peel geometry at a speed of 100 mm/min and room temperature.

13. The flexible laminate as in claim 12 wherein the bond/peel strength of the first adhesive region is lower than 1.1 N/15 mm, and the bond/peel strength obtained in the second adhesive region is higher than 1.6 N/15 mm.

14. The flexible laminate as in claim 12 wherein the bond/peel strength of the first adhesive region is lower than 0.9 N/15 mm, and the bond/peel strength obtained in the second adhesive region is higher than 1.8 N/15 mm.

15. The flexible laminate as in claim 12 wherein the bond/peel strength obtained in the second adhesive region is higher than 3.0 N/15 mm.

16. A reclosable packaging comprising the flexible laminate as claim 1.

17. A method for preparing the flexible laminate according to claim 1 comprising the steps of:
  applying a layer of adhesive precursor onto one surface of the inner or outer structure;
  converting said adhesive precursor by a chemical reaction in the second region and optionally in the first region and creating patterns of first and second regions, the first adhesive region having a lower bond/peel strength than the second adhesive region and the first adhesive region being permanently tacky;

scoring the inner and outer structures by a scoring station before or after adhesively joining the inner structure to the outer structure face to face to form the laminate, an outer score line being formed through the thickness of the outer structure in registration with the outer perimeter of the first adhesive region, and an inner score line being formed through the thickness of the inner structure in registration with the inner perimeter of the first adhesive region.

18. The method as in claim 17, wherein the second adhesive region and the first adhesive region are patterned, and wherein the position of the opening initiation is covered by a release layer or wherein the position of the opening initiation is adhesive-free.

19. The method as in claim 17, wherein the patterned conversion of adhesive precursor into the first and second adhesive regions is obtained through the patterned addition of one or more crosslinking agents to a crosslinking agent-free adhesive precursor or if a blend of crosslinking agent and adhesive precursor is applied, through the patterned addition of one or more crosslink modifiers.

20. The method as in claim 17, wherein the adhesive precursor comprises one or more carboxyl groups or hydroxyl groups or acetoacetyl groups.

21. The method as in claim 17, wherein the crosslinking agent is a molecule comprising carbodiimide and/or isocyanate groups or a lower-alkoxylated amino formaldehyde.

22. The method as in claim 17, further comprising the step of treating one surface of the outer or inner structure with a corona or flame treatment to increase the bonding affinity with the first adhesive such that the first adhesive tends to remain adhered to the treated surface when the opening portions are peeled back.

* * * * *